(12) United States Patent
Hirakata et al.

(10) Patent No.: US 6,570,629 B1
(45) Date of Patent: *May 27, 2003

(54) DISPLAY UNIT INCLUDING FIRST AND SECOND ACTIVE MATRIX REGIONS THAT IS PROVIDED COMPLETELY OUTSIDE EACH OTHER

(75) Inventors: Yoshiharu Hirakata, Kanagawa (JP); Shunpei Yamazaki, Tokyo (JP); Satoshi Teramoto, Kanagawa (JP); Jun Koyama, Kanagawa (JP)

(73) Assignee: Semiconductor Energy Laboratory Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/731,297

(22) Filed: Oct. 15, 1996

(30) Foreign Application Priority Data

Oct. 14, 1995 (JP) ............................................. 7-291762
Oct. 15, 1995 (JP) ............................................. 7-293745

(51) Int. Cl.$^7$ ........................ G02F 1/1335; G02F 1/133; G02B 27/22; G09G 5/00
(52) U.S. Cl. ............................ 349/15; 349/8; 349/73; 359/462; 345/7
(58) Field of Search ............................ 349/8, 15, 73; 359/465, 462; 345/5, 7, 87

(56) References Cited

U.S. PATENT DOCUMENTS

| | | | |
|---|---|---|---|
| 2,729,138 A | * 1/1956 | Bernier | 359/465 |
| 4,385,806 A | * 5/1983 | Fergason | 350/347 |
| 4,792,850 A | * 12/1988 | Liptoh et al. | 358/92 |
| 4,884,876 A | * 12/1989 | Lipton et al. | 350/347 |
| 4,954,890 A | * 9/1990 | Park | 358/88 |
| 4,978,202 A | * 12/1990 | Yang | 350/334 |
| 5,050,961 A | * 9/1991 | Venolia | 359/465 |
| 5,113,285 A | * 5/1992 | Franklin et al. | 359/465 |
| 5,264,964 A | * 11/1993 | Faris | 359/465 |
| 5,598,123 A | * 1/1997 | Lin | 359/465 |
| 5,856,689 A | 1/1999 | Suzawa | 257/296 |
| 5,894,361 A | * 4/1999 | Yamazaki et al. | 349/15 |

* cited by examiner

*Primary Examiner*—William L. Sikes
*Assistant Examiner*—Tarifur R. Chowdhury
(74) *Attorney, Agent, or Firm*—Fish & Richardson P.C.

(57) ABSTRACT

Active matrix domains are integrated and disposed on one and the same substrate. Then, directions of orientation are differentiated by 90° for one active matrix domain and the other active matrix domain. As a result, two images whose polarizing directions differ by 90° are formed when images formed in the two active matrix domains are combined. Then, one image is appropriated as an image for right eye and the other image as an image for left eye and the combined image is seen by wearing glasses equipped with polarizing filters whose polarizing directions are different by 90° for the right and left eyes. Then, the image for the right eye and that for the left eye may be seen independently and a stereoscopic image may be obtained.

33 Claims, 10 Drawing Sheets

DISPLAY UNIT INCLUDING FIRST AND SECOND ACTIVE MATRIX REGIONS THAT IS PROVIDED COMPLETELY OUTSIDE EACH OTHER

DETAILED DESCRIPTION OF THE INVENTION

1. Field of the Invention

The present invention disclosed in the present specification relates to a display unit which can display a three-dimensional image or two different images on one and the same screen.

2. Description of Related Art

Hitherto, there has been known a method of obtaining a three-dimensional image by separately perceiving an image for right eye and that for left eye by utilizing different polarization states. There has been also known a technology for obtaining a three-dimensional image by forming an image for right eye and that for left eye by utilizing two projectors and by viewing them independently by the right and left eyes (see "Three-Dimensional Display" by Chihiro Masuda, Sangyo Tosho Publishing Co.).

However, there have been problems in realizing a display unit having such formation that it would be complicated, the production cost thereof would be high and their reliability would be low.

Further, because of the increased complexity and size of the whole structure thereof, it has been difficult to apply it simply as various display means. For example, the display means thereof has not been able to be applied simply to game machines, to display units of public facilities and to medical purposes. That is, because the unit itself has been complex and large, its general utility has been low.

Accordingly, it is an object of the present invention to be disclosed in the present specification to provide a display unit whose cost is low, which is highly reliable and which can display three-dimensional images, thus having an excellent general utility. Further, it is an object to provide a display unit having a formation which allows to display two different images on one screen in the same time by the same principle with the display of the three-dimensional image.

SUMMARY OF THE INVENTION

According to one invention disclosed in the present specification, a display unit has a first liquid crystal panel and a second liquid crystal panel; and means for projecting images from those two liquid crystal panels on one and the same projecting face in superposition; and is characterized in that the two liquid crystal panels have first polarizing plate and a second polarizing plate in order from a light source; and a polarizing direction of the first polarizing plate of the first liquid crystal panel and a polarizing direction of the second polarizing plate of the second liquid crystal panel are same or almost same.

The formation described above is characterized in that as shown in FIG. 2, the polarizing plates of respective two liquid crystal panels (the two liquid crystal panels are integrated by using one and the same substrate in case of FIG. 2) have a relationship as indicated by directions of arrows in the figure.

Figure 2:
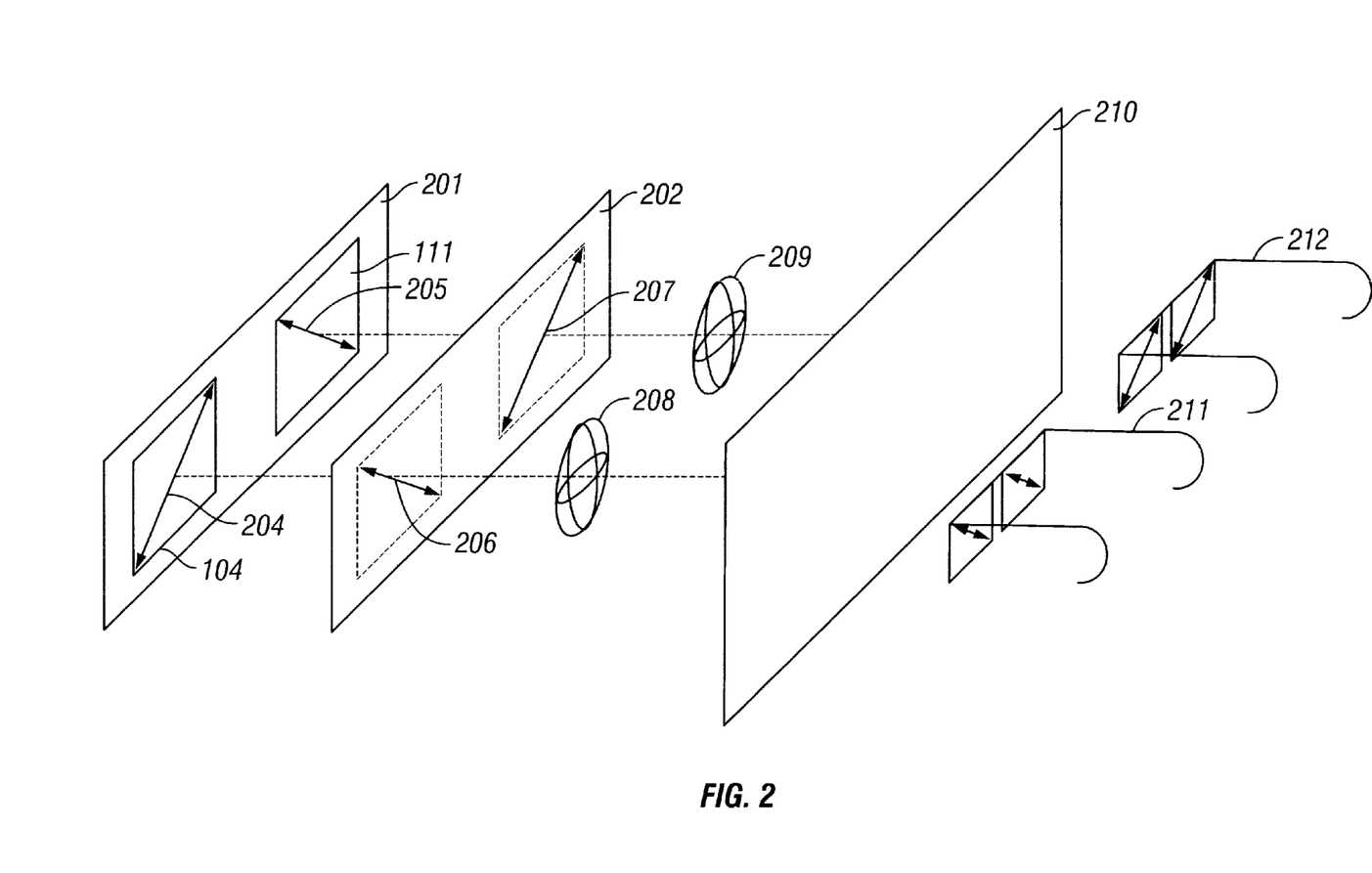
FIG. 2 is a drawing showing a schematic optical formation for projecting different images.

In FIG. 2, arrows 204 and 205 correspond to the polarizing directions of the first polarizing plate and arrows 206 and 207 correspond to the polarizing directions of the second polarizing plate. The above-mentioned invention is characterized in that the polarizing directions 204 and 207 of the first polarizing plate of one liquid crystal panel and of the second polarizing plate of the other liquid crystal panel are same or approximately same.

The most simplest formation among concrete formations of the above-mentioned formation is to prepare two liquid crystal panels which are totally same, to dispose one by turning by 90° and to combine images from the two liquid crystal panels on an adequate projecting face by using an optical system.

In this case, one image is appropriated as an image for right eye and the other image as an image for left eye, for example. A stereoscopic image may be seen by seeing the images by wearing special glasses which permit to see them whose orientations differ by 90° for the right and left eyes.

Figure 1:
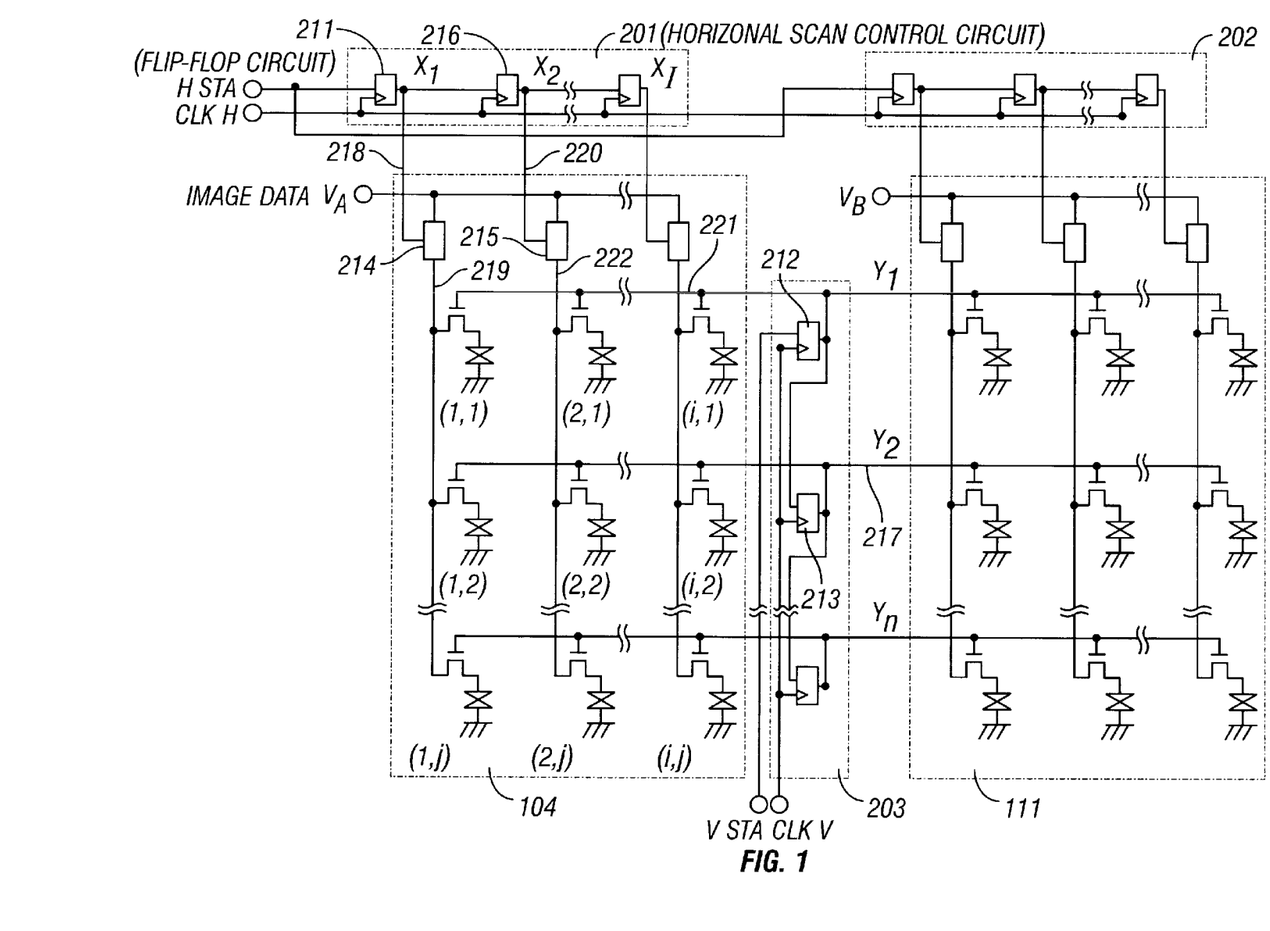
FIG. 1 is a diagram showing a formation of an integrated liquid crystal panel.
Figure 7A:
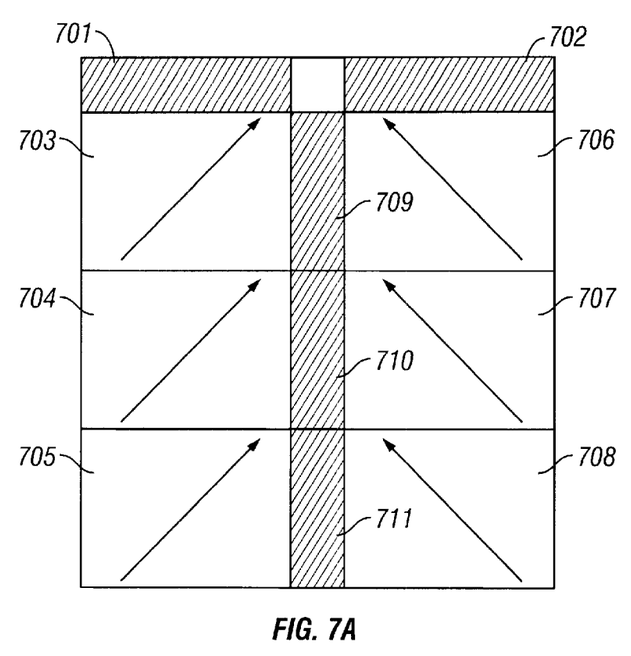
FIGS. 7A and 7B are drawings showing states of orientation of the integrated liquid crystal panel.
Figure 7B:
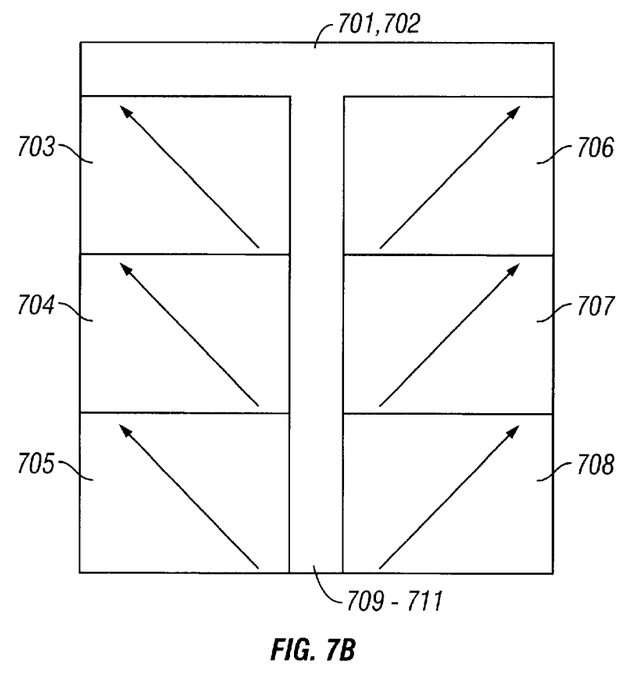

Formations shown in FIGS. 1 and 7 described later may be exemplified concretely as one example of the above-mentioned formation. The formations shown in FIGS. 1 and 7 are characterized most in that the active matrix domains which can form images, respectively, are integrated on one and the same substrate, i.e. a plurality of liquid crystal panels are combined.

According to another invention, a display unit has a first liquid crystal panel and a second liquid crystal panel; and means for projecting images from the two liquid crystal panels on one and the same projecting face in superposition; and is characterized in that the two liquid crystal panels have first polarizing plate and a second polarizing plate in order from a light source; and a polarizing direction of the second polarizing plate of the first liquid crystal panel and a polarizing direction of the second polarizing plate of the second liquid crystal panel are different by 90° or approximately 90°.

FIG. 2 shows a concrete example of the formation described above. FIG. 2 shows the formation in which orientations of the polarizing direction 206 of the second polarizing plate of the part which corresponds to the first liquid crystal panel and of the polarizing direction 207 of the second polarizing plate of the part which corresponds to the second liquid crystal panel are different by 90° from each other in the liquid crystal panels in which two active matrix domains are integrated.

According to still another invention, a display unit has a plurality of active matrix domains integrated by using one and the same substrate; and horizontal scan control circuits for performing horizontal scan control of the plurality of active matrix domains formed on the same substrate in common to the plurality of active matrix domains; and is characterized in that orientation films disposed on the plurality of active matrix domains are divided into two groups between which orientations are different by 90°.

FIG. 7 shows a concrete example of the aforementioned formation in which horizontal scan of the active matrix domains 703 through 705 integrated on one and the same substrate is carried out by the common horizontal scan control circuit 701.

FIG. 7 also shows a formation in which the orientation of the orientation film disposed on the active matrix domains 703 through 705 is different by 90° from that of the orientation film disposed on the active matrix domains 706 through 708.

According to still another invention, a display unit has a plurality of active matrix domains integrated by using one and the same substrate; and vertical scan control circuits for performing vertical scan control of the plurality of active matrix domains formed on the same substrate in common to the plurality of active matrix domains; and is characterized in that orientation films disposed on the plurality of active matrix domains are divided into two groups between which orientations are different by 90°.

FIG. 1 or 7 show a concrete example of the aforementioned formation.

According to still another invention, a display unit has a plurality of active matrix domains integrated by using one and the same substrate; and horizontal scan control circuits and vertical scan control circuits for performing horizontal scan control and vertical scan control of the plurality of active matrix domains formed on the same substrate respectively in common to the plurality of active matrix domains; and is characterized in that orientation films disposed on the plurality of active matrix domains being divided into two groups between which orientations are different by 90°.

FIG. 7 shows a concrete example of the aforementioned formation.

According to one invention disclosed in the present specification, a display unit has a formation in which a plurality of active matrix domains are integrated on one and the same substrate and in which a half of the plurality of active matrix domains have first orientation means and another half of the plurality of active matrix domains have second orientation means; means for inputting linearly polarized light adjusted to the orientation means to each panel corresponding to the first and second orientation means; and is characterized in that rubbing directions are different in the first and second orientation means.

According to another invention, a display unit has a formation in which a plurality of active matrix domains are integrated on one and the same substrate; orientation means by which an orientation of at least one of the plurality of active matrix domains is different with respect to that of another active matrix domain by 90° or approximately by 90°; and means for inputting a linearly polarized light having different polarization direction of 90° or approximately 90° respectively to at least one of the plurality of active matrix domains and another active matrix domain.

According to the invention disclosed in the present specification, the display unit is characterized in that at least two horizontal scan controls of the plurality of active matrix domains are carried out by a common horizontal scan control circuit in the integrated liquid crystal panels.

Further, the display unit is characterized in that at least two vertical scan controls of the plurality of active matrix domains are carried out by a common vertical scan control circuit in the integrated liquid crystal panels.

DESCRIPTION OF THE PREFERRED EMBODIMENTS

First Embodiment

The present embodiment pertains to a formation which allows a plurality of observers to view different images. In the present embodiment, a liquid crystal panel in which a plurality of active matrix domains and peripheral circuit domains for driving the active matrix domains are integrated on one and the same substrate is used in order to simplify the formation, to increase its reliability, to lower the production cost and to increase its general utility.

The integrated liquid crystal panel is characterized in that the peripheral circuits are disposed in common to the plurality of active matrix domains. Thereby, the formation may be simplified and the reliability of the unit itself may be increased. It also allows the production cost to be lowered.

FIG. 1 shows an outline of the integrated liquid crystal panel used in the present embodiment. In the figure, active matrix domains 104 and 111, a common vertical scan control circuit 203 for driving those active matrix domains, a horizontal scan control circuit 201 for driving the active matrix domain 104 and a horizontal scan control circuit 202 for driving the active matrix domain 111 are integrated on one and the same glass or quartz substrate.

This formation may be said as the formation that two liquid crystal panels are combined (integrated) by using one and the same substrate.

Each of the active matrix domains 104 and 111, the horizontal scan control circuits 201 and 202 and the vertical scan control circuit 203 are formed as a thin film integrated circuit directly on the glass or quartz substrate. In concrete, they are formed by thin film transistors using thin film silicon semiconductors having a crystalline quality.

Further, in the formation shown in FIG. 1, rubbing directions of orientation films for giving orientations to liquid crystal are different just by 90° in the active matrix domains 104 and 111, though it is not shown in the figure. In the present embodiment, the above-mentioned formation is realized by using TN type liquid crystal to differentiate polarizing directions of images formed in each active matrix domain by 90° from each other.

It is noted that the rubbing direction in the present specification assumes an orientation of the whole. That is, when the orientation subtly changes in very small domains, the orientation is defined to be the direction into which the liquid crystal is oriented as a whole.

FIG. 2 shows a schematic optical formation of the present embodiment. In the figure, the reference numeral (201) denotes the glass or quartz substrate on whose surface the formation shown in FIG. 1 is formed and (202) a glass or quartz substrate which constitutes an opposite substrate. The TN type liquid crystal 203 is held in a gap therebetween (it is shown exaggeratedly in the figure).

As shown in the figure, a rubbing film oriented in a direction of arrow 204 is disposed on the active matrix domain 104. Further, a rubbing film oriented in a direction of arrow 205 is disposed on the active matrix domain 111.

Then, a rubbing film oriented in a direction of arrow 206 and that oriented in a direction of arrow 207 are disposed on the opposite substrate 202. Each rubbing film is disposed so as to correspond to the active matrix domains 104 and 111, respectively.

Further, polarizing plates are disposed on the outside of the substrates 201 and 202 so as to be adjusted to the respective rubbing directions, though they are not shown in order not to complicate the figure.

Images formed by being optically modulated in each active matrix domain are projected and superposed onto a screen 210 through projecting lenses 208 and 209. The arrows 206 and 207 represent polarizing directions of the respective images.

That is, the image formed in the active matrix domain 104 is projected onto the screen 210 as having the linear polarizing direction indicated by the arrow 206. Further, the image formed in the active matrix domain 111 is projected onto the screen 210 as having a linear polarizing direction indicated by the arrow 207.

If the observer sees this screen in a normal manner, those two images are doubled, because human eyes don't have an ability for discerning the polarizing states. However, if the observers see the screen 210 by wearing special glasses 211 and 212 on which polarizing filters having polarizing directions as indicated by arrows are disposed respectively, they can see the two images separately and selectively.

That is, because the image formed in the active matrix domain 104 has the polarizing direction indicated by the arrow 206, it can be seen selectively by the glasses 211. At this time, the image formed in the active matrix domain 111 cannot be seen by the glasses 211 because it has the polarizing direction indicated by the arrow 207.

On the other hand, because the image formed in the active matrix domain 111 has the polarizing direction indicated by the arrow 207, it can be seen selectively by the glasses 212. At this time, the image formed in the active matrix domain 104 cannot be seen by the glasses 212 because it has the polarizing direction indicated by the arrow 206.

Thus, two different images may be displayed concurrently and be seen selectively by utilizing the polarizing plates which are originally disposed in a liquid crystal display unit.

If the images formed in the active matrix domains 104 and 111 are the same one in the formation illustrated in the present embodiment, the same images having different polarizing directions are displayed on the screen 210. When the observer see this screen in a normal manner, it is not different with the case of seeing a normal projector type display unit.

That is, the formation illustrated in the present embodiment allows a normal image to be displayed by selecting an image to be displayed.

A method for operating the integrated liquid crystal panel shown in FIG. 1 will be briefly explained below for reference. It is noted that while an operation with respect to the active matrix domain 104 will be explained here in order to simplify the explanation, the same operation is carried out in the same timing also in the other active matrix domain.

In FIG. 1, the reference numerals (211, 216, 212 and 213) denote flip-flop circuits. A flip-flop circuit is a circuit which can have two stable states. For example, when an input (at point $X_1$) of the flip-flop circuit 216 is on H level (logically high level) and an output (at point $X_2$) thereof is on L level (logically low level), the output changes to H level by inputting a leading edge of CLKH (operation clock of horizontal scan control circuit). That is, the point $X_2$ turns to H level. This state is maintained unless a next leading edge of the CLKH is input.

Further, when the input of the flip-flop circuit 216 is on L level and the output thereof is on H level for example, the output thereof changes to L level when a leading edge of the CLKH is input.

When the input of the flip-flop circuit 216 is on L level and the output thereof is also on L level, the output is maintained on L level when a leading edge of the CLKH is input.

At first, a leading edge of the CLKV (operation clock of the vertical scan control circuit) is input to the flip-flop circuit 212 of the vertical scan control circuit 103. Then, a HSTA (horizontal scan timing enable signal) is beaten by the CLKV.

That is, when the leading edge of the CLKV is input to the flip-flop circuit 212 in the state when a signal of the HSTA on H level is applied to the input of the flip-flop circuit 212, the output of the flip-flop circuit 212 turns to H level. As a result, the signal on a row $Y_1$ turn to H level.

When the signal on the row $Y_1$ turns to H level, thin film transistors of each of pixels indicated by respective addresses (1, 1), (2, 1) . . . (i, 1) are all turned ON.

In this state, the leading edge of the CLKH (operation clock of the horizontal scan control circuit) is input to the flip-flop circuit 211 to beat the CLKH (horizontal scan timing enable signal). As a result, the signal level at the point $X_1$ turns to H level.

Because the inputs of the flip-flop circuits 216 and after are all on L level in the stage when the CLKH described above is input, the outputs of the flip-flop circuits 216 and after are all on L level in this state.

Then, an image sampling signal line 218 turns to H level. As a result, image data of an image $V_A$ is taken into a sample and hold circuit 214. Then, a signal that corresponds to a predetermined image data is flown to an image signal line 219. That is, a predetermined image signal is applied to a source of the thin film transistor of each pixel indicated by addresses (1, 1), (1, 2), . . . (1, j).

In this state, the thin film transistor of each pixel indicated by the addresses (1, 1), (2, 1), . . . (i, 1) are all turned ON. Accordingly, image information is written only to the pixel at the address (1, 1).

Next, the output of the flip-flop circuit 211 turns to L level when the next leading edge of the CLKH is input. Further, the output of the flip-flop circuit 216 turns to H level. Thus, the level at the point $X_2$ turns to H level. In this state, points indicated by $X_j$, other than the point $X_2$, are all on L level.

As a result, predetermined image data is taken into a sample and hold circuit 215 and information is written to a pixel at the address (2, 1).

Thus, information is written sequentially up to the address (i, 1) in accordance to the clock signal of the CLKH.

When writing information to the row $Y_1$ is completed, the output of the flip-flop circuit 212 turns to L level by the next leading edge of the CLKV and the output of the flip-flop circuit 213 turns to H level.

Information is thus written to the row $Y_2$. Information is thus written sequentially to each pixel and at the moment when information is written to the pixel at the address (i, j), display of one frame is finished. This frame is repeated 30 times per second for example. An image is thus displayed.

Second Embodiment

Figure 3:
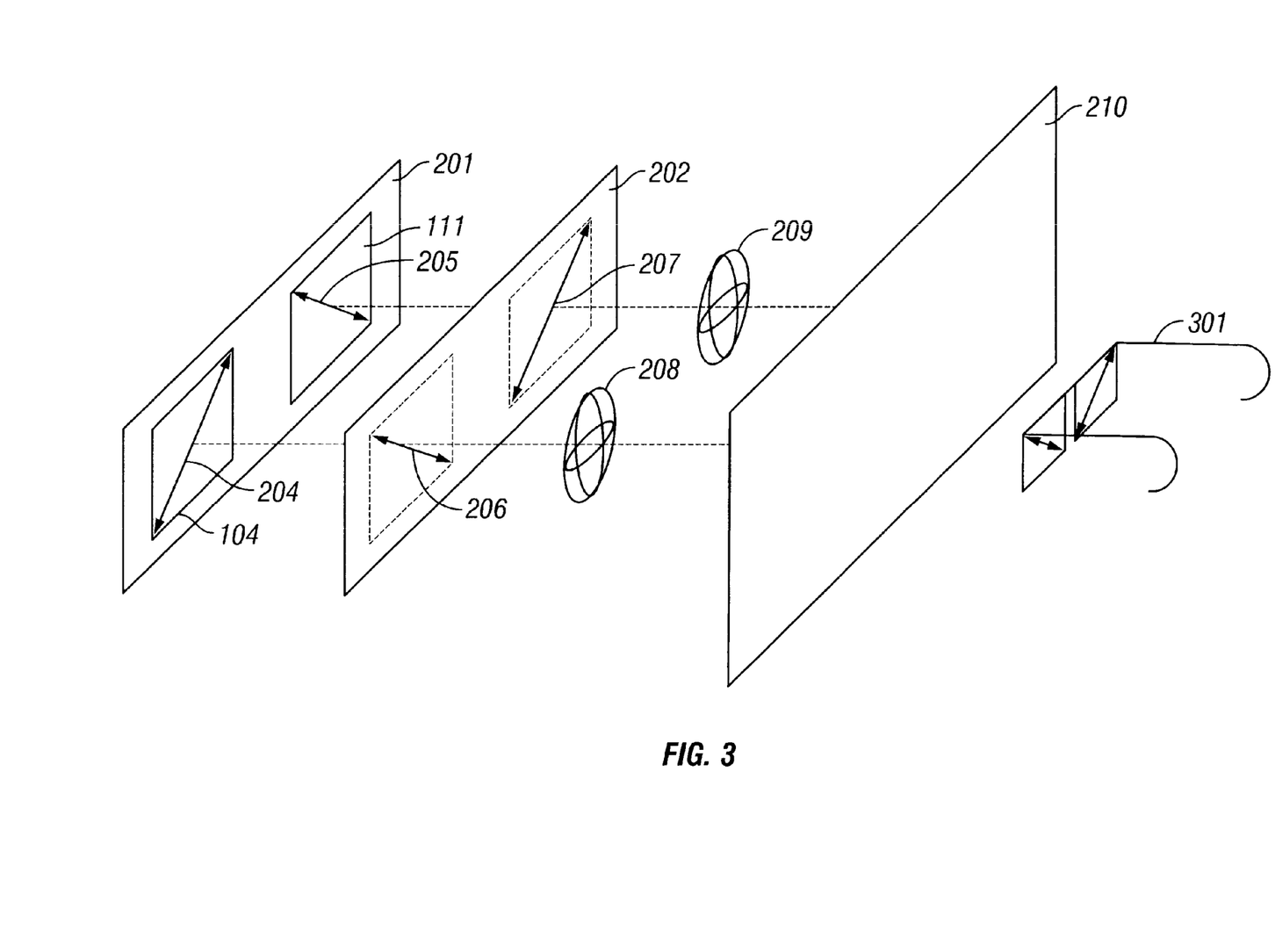
FIG. 3 is a drawing showing a schematic optical formation for projecting a stereoscopic image.

The present embodiment pertain to a formation for displaying a stereoscopic image. FIG. 3 shows the schematic optical formation of the present embodiment. The parts denoted by the same reference numerals with those in FIG. 1 have the same structure with those shown in FIG. 1.

In the formation shown in FIG. 3, two images having polarizing directions indicated by the arrows 206 and 207 are superposed and displayed on the screen 210. Then, in the present embodiment, it is adapted to see the screen 210 by wearing glasses 301 on which polarizing filters which transmit polarized lights whose directions differ by 90° as indicated by arrows are disposed for right and left eyes.

Further, the image formed in the active matrix domain 104 is appropriated as an image for the left eye for forming a stereoscopic image and the image formed in the active matrix domain 111 as an image for the right eye for forming the stereoscopic image.

Thereby, the image formed in the active matrix domain 104 enters the left eye of the person wearing the glasses 301 and the image formed in the active matrix domain 111 enters the right eye selectively. Then, the person wearing the glasses 301 can see the stereoscopic image selectively.

It is noted that normal two-dimensional display can be made also by the formation illustrated in the present embodiment by displaying the same image in the active matrix domains 104 and 111 and by seeing the screen 210 in a normal manner.

Third Embodiment

Figure 4:
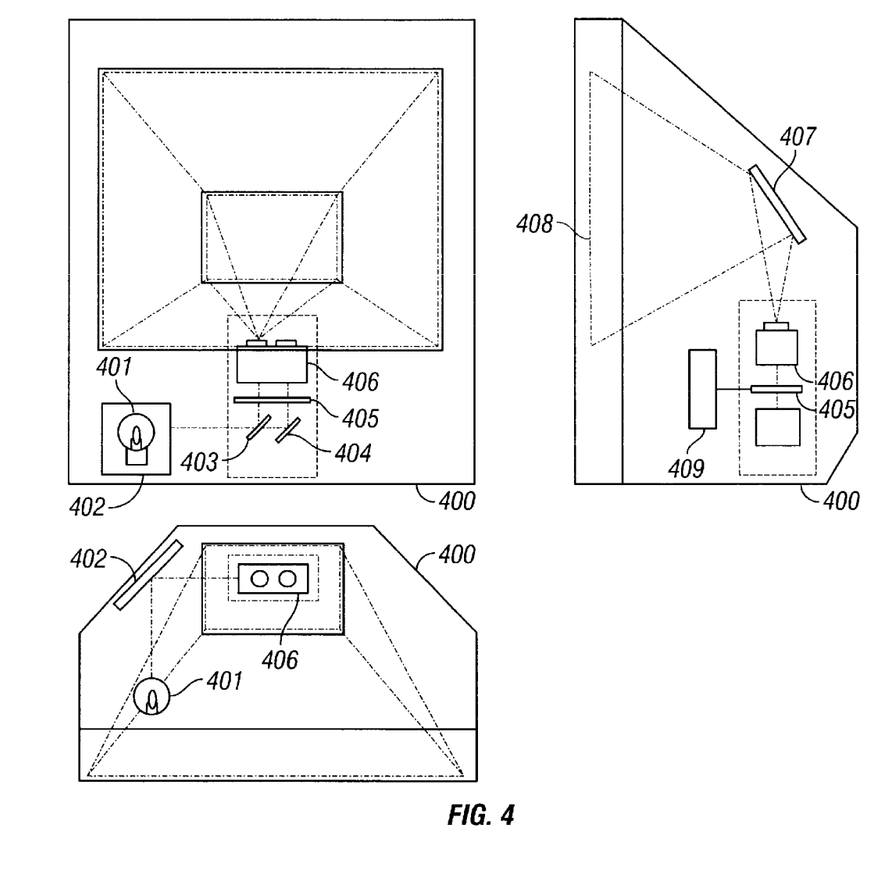
FIG. 4 is a drawing showing a schematic formation of a display unit.

The present embodiment pertains to a display unit having the optical formations shown in the first and second embodiments. FIG. 4 shows a schematic structure of the present embodiment.

In FIG. 4, the reference numeral (405) denotes the liquid crystal panel on which the two active matrix domains whose outlines are shown in FIG. 1 are integrated. In FIG. 4, light emitted from a light source 401 is reflected by a mirror 402 and is then reflected by a half mirror 403 and a mirror 404, thus turning into two light beams. These light beams enter the integrated liquid crystal panel 405 to be optically modulated in a predetermined manner.

The two active matrix domains on the liquid crystal panel 405 are adapted to be able to form color images by using color filters, respectively. Two images obtained by optically modulating by the liquid crystal panel 405 are projected through an optical system 406, respectively.

The projected light from the optical system 406 is reflected by a mirror 407 and is projected onto a screen 408. That is, the two images optically modulated by the liquid crystal panel 405 are superposed and projected onto the screen 408.

Here, the polarizations of those two images differ by 90° from each other as its principle is shown in FIG. 1. Accordingly, this unit may be used for the formations shown in FIGS. 2 and 3.

Fourth Embodiment

The present embodiment pertains to a formation in which a crosstalk between different images is improved further in the formation for seeing two different images separately illustrated in the first embodiment.

In the formation illustrated in the first embodiment, the other image is seen when the observer tilts his/her head because the linearly polarized lights whose polarizations differ by 90° are utilized. That is, the crosstalk aggravates. This applies also to the cases of FIGS. 2 and 3.

Figure 5:
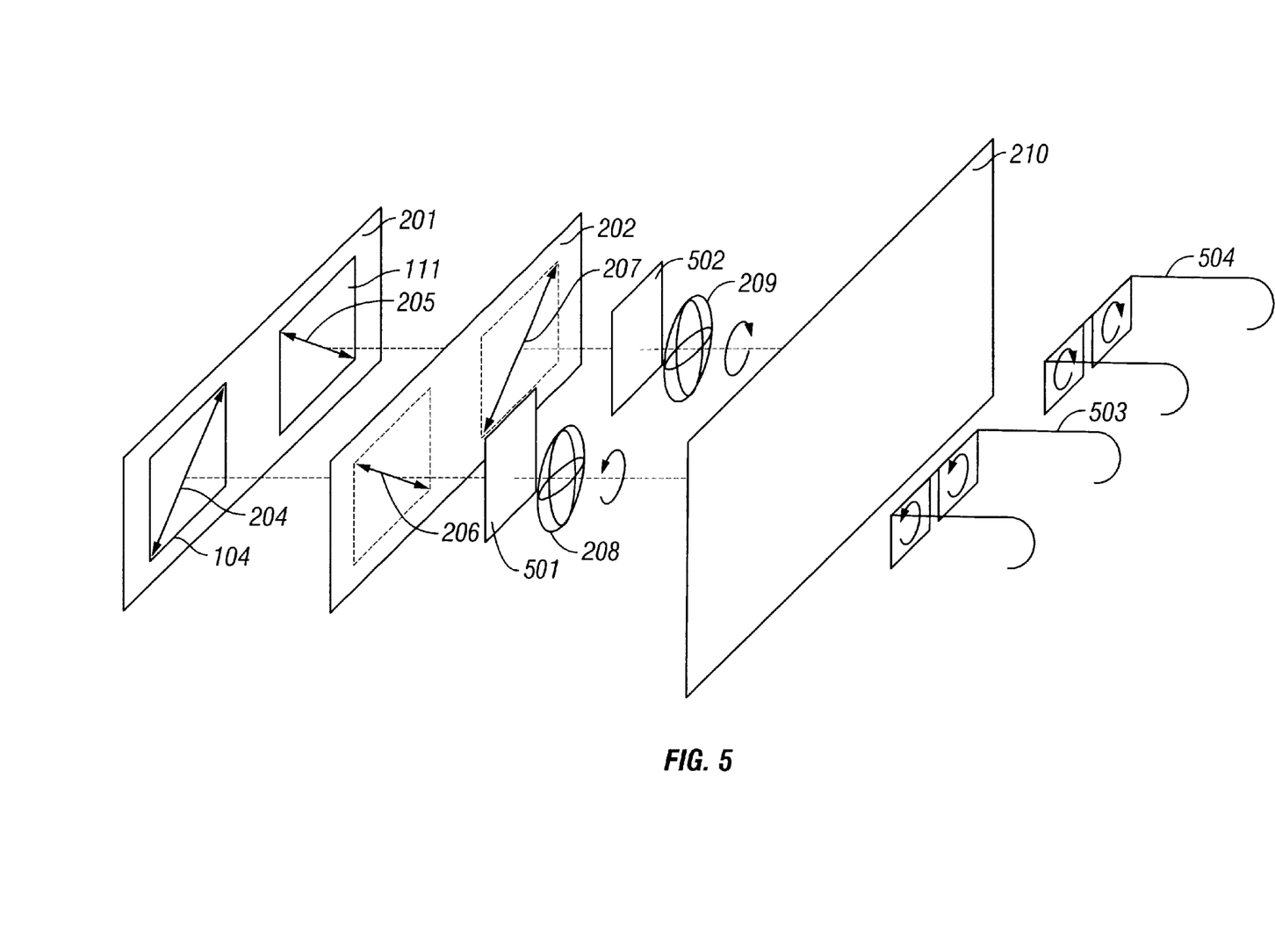
FIG. 5 is a drawing showing a schematic optical formation for projecting different images.

Then, quarter wavelength plates 501 and 502 are disposed in optical paths where respective images pass through as shown in FIG. 5 in the present embodiment. Then, the respective images become a clockwise circular polarized light image and a counterclockwise circular polarized light image.

In the case shown in FIG. 5, a person wearing glasses 503 having an optical filter which transmits the clockwise circularly polarized light image and a person wearing glasses 504 having an optical filter which transmits the counterclockwise circularly polarized light image can see different images, respectively.

The crosstalk between two images may be reduced by adopting the formation illustrated in the present embodiment.

Fifth Embodiment

Figure 6:
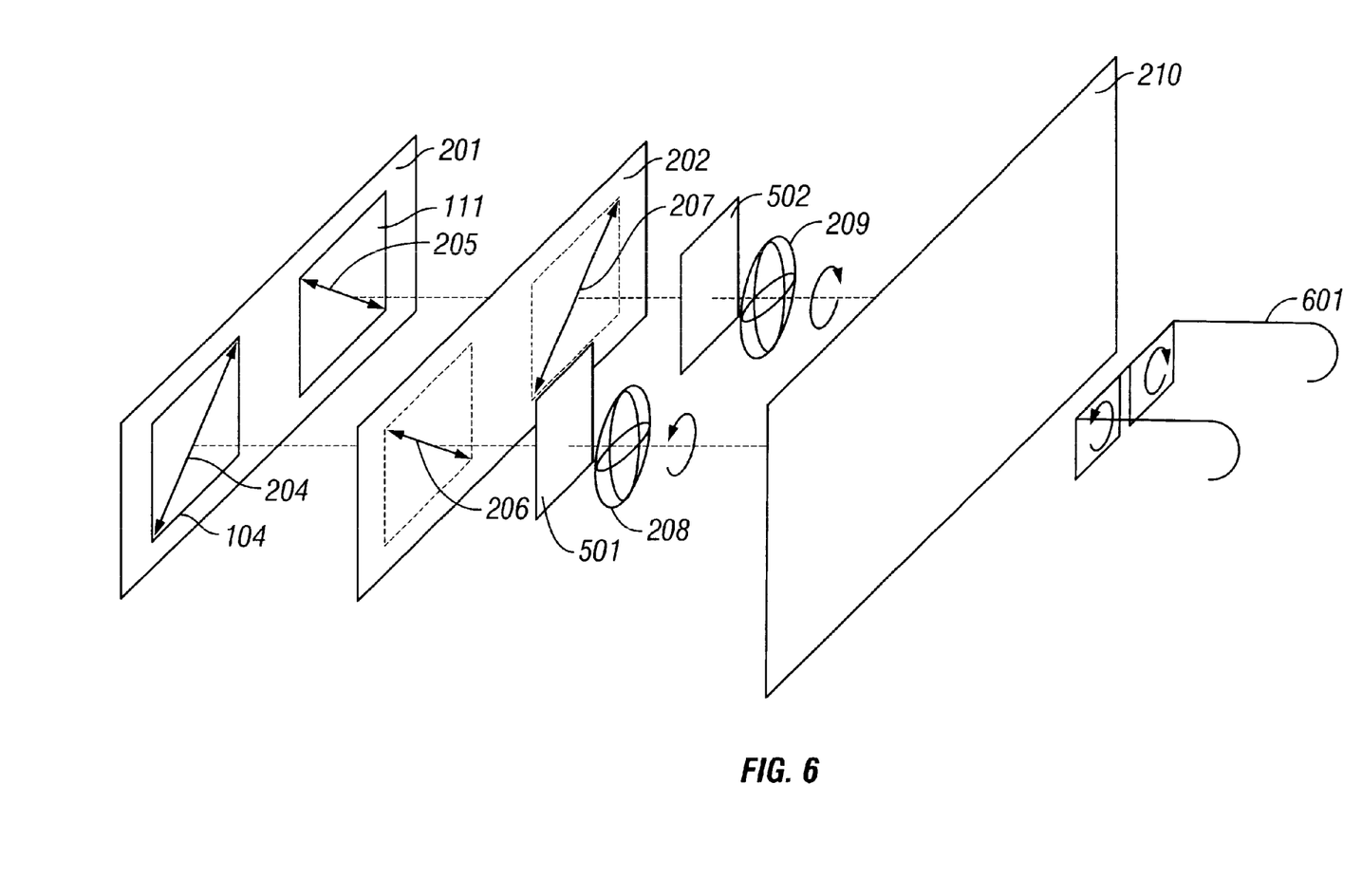
FIG. 6 is a drawing showing a schematic optical formation for projecting a stereoscopic image.

As shown in FIG. 6, according to the present embodiment, the quarter wavelength plates 501 and 502 are disposed in the optical paths where respective images pass similarly to the case shown in FIG. 5 to display a stereoscopic image.

In the case of the formation shown in FIG. 6, wearing glasses 601 having optical filters which transmit circularly polarized lights in specific turn directions allows an image for right eye which transmits through the optical filter which transmits the clockwise circularly polarized light image and an image for left eye which transmits through the optical filter which transmits the counterclockwise circularly polarized light image to be seen selectively by the right and left eyes, respectively. Thereby, the stereoscopic image may be seen.

The crosstalk between the images for right and left eyes may be reduced by adopting the formation illustrated in the present embodiment.

Sixth Embodiment

Figure 8A:
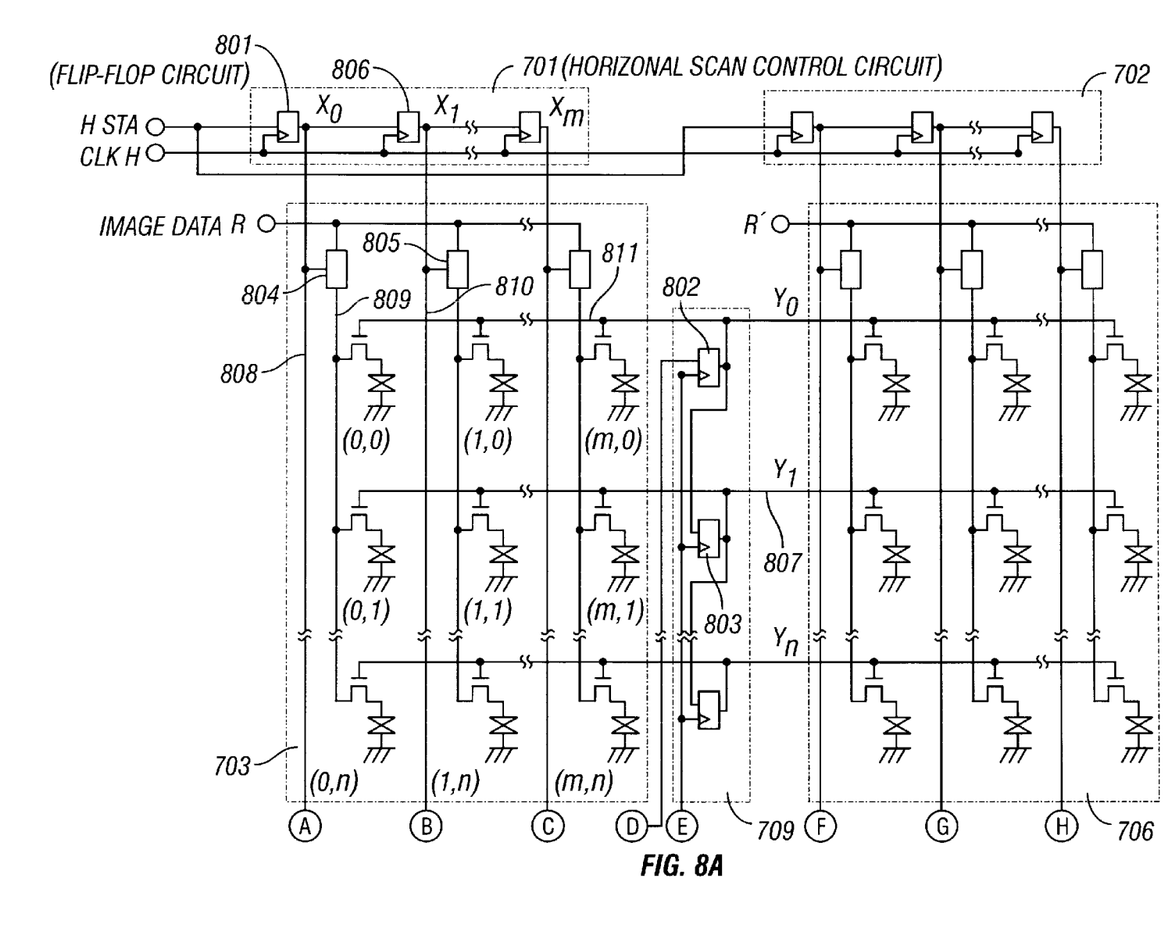
FIG. 8 is a diagram showing an outline of an integrated liquid crystal panel.
Figure 8B:
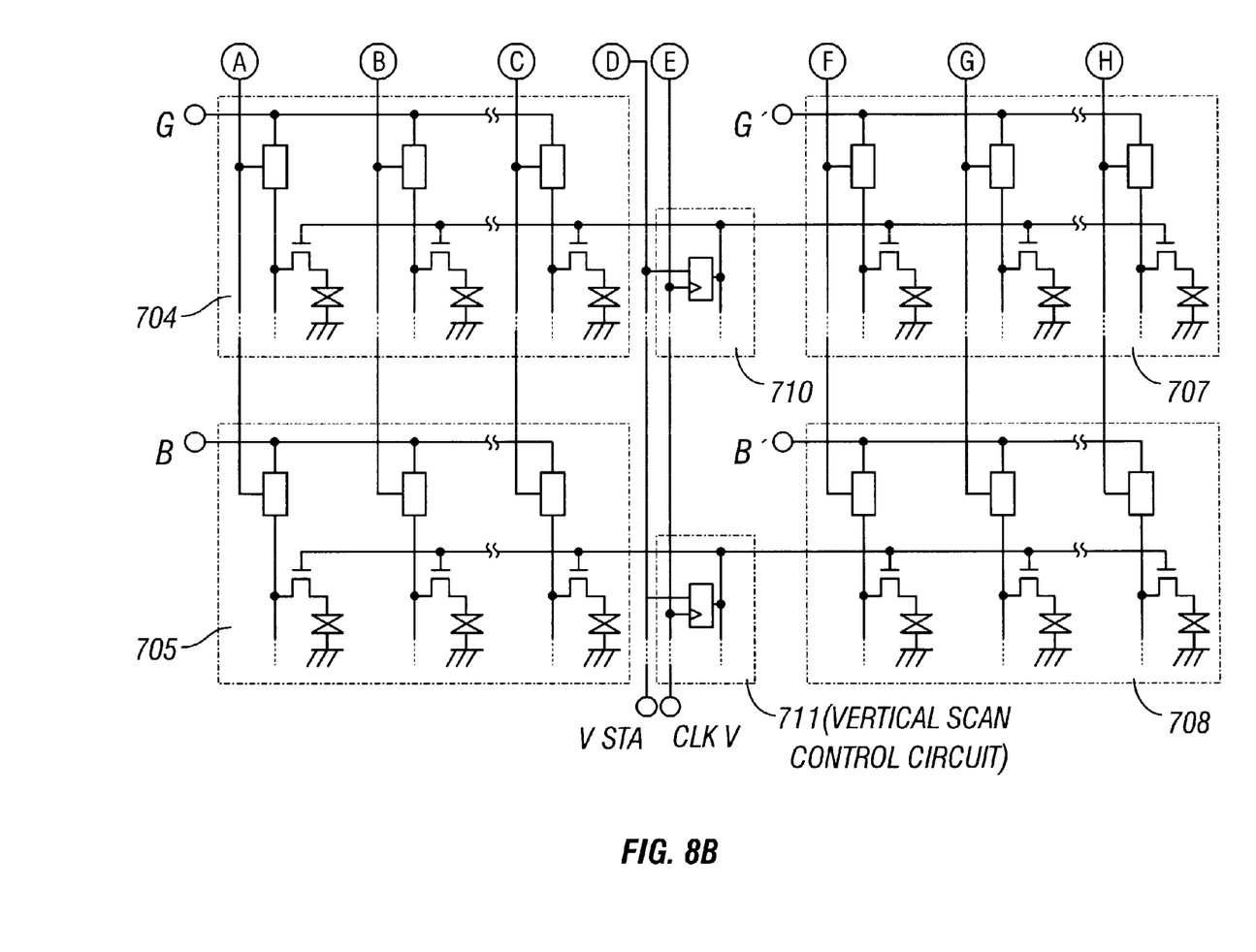

FIGS. 7A and 7B show arrangements of orientation treatment means on the integrated liquid crystal panel. FIG. 7A shows the glass substrate (or quarts substrate) on the side in which main circuits whose configuration is shown in FIG. 8 are disposed and FIG. 7B shows the opposite substrate.

As shown in FIG. 7A, the orientation is differentiated by 90° between a set of domains 703 through 705 and a set of domains 706 through 708. The corresponding domains on the opposite substrate are also oriented similarly by dividing into two sets.

In the present embodiment, different images are formed in the set of domains 703 through 705 and in the set of domains 706 through 708, respectively. That is, a first image composed of RGB is formed in the set of domains 703 through 705 and a second image composed of R'G'B' is formed in the set of domains 706 through 708.

Then, those first and second images are superposed and projected as described later. That is, the two images composed of RGB and R'G'B' and having polarizing directions different by 90° each other are projected in superposition.

The first and second images may be seen separately by right and left eyes by viewing through polarizing filters having polarizing directions different by 90° each other for the right and left eyes.

Then, the images may be perceived as a stereoscopic image by appropriating the first image as the image for the right eye and the second image as the image for the left eye.

The integrated liquid crystal panel shown in FIGS. 7A and 8 has a formation in which active matrix domains for forming M×N images and M+N peripheral circuit domains are disposed on the substrate, wherein M and N being a natural number more than 2, and is characterized in that each of the M peripheral circuits performs horizontal scan control of N active matrix domains concurrently and each of the N peripheral circuits performs vertical scan control of the M active matrix domains concurrently.

FIG. 8 shows a case when M=2 and N=3 in the formation described above. That is, (M=2)×(N=3) of active matrix domains 703, 704, 705, 706, 707 and 708 are disposed in FIG. 8.

Further, 2+3 of peripheral circuits 701, 702, 709, 710 and 711 are disposed as the peripheral circuits for driving those active matrix circuits. Among the peripheral circuits, the peripheral circuits 701 and 702 are the horizontal scan control circuits, and the peripheral circuits 709, 710 and 711 are the vertical scan control circuits.

In the formation shown in FIG. 8, the horizontal scan control circuits 701 and 702 perform the horizontal scan control of the active matrix circuits 703, 704 and 705 and the circuits 706, 707 and 708, respectively, in the same time.

That is, the peripheral circuit 701 performs the horizontal scan control of the active matrix domains 703, 704 and 705 in the same time and the peripheral circuit 702 performs the horizontal scan control of the active matrix domains 706, 707 and 708 in the same time.

Further, the peripheral circuits 709, 710 and 711 perform the vertical scan control of the active matrix domains 703 and 706, the domains 704 and 707 and the domains 705 and 708, respectively, in the same time.

That is, the peripheral circuit 709 performs the vertical scan control of the active matrix domains 703 and 706 in the same time, the peripheral circuit 710 performs the vertical scan control of the active matrix domains 704 and 707 and the peripheral circuit 711 performs the vertical scan control of the active matrix domains 705 and 708 in the same time.

While the liquid crystal panel shown in FIG. 8 is constructed so as to be N=3 in order to obtain color images of RGB, it may be constructed such that M=N=2 (i.e. 2×2), M=2 and N=1, or M=1 and N=2. In this case, it may be adapted to obtain color images in each active matrix domain by using color filters of RGB or to obtain monochrome images. However, the formation shown in FIG. 8 allows to obtain a remarkable usefulness when M and N are a number of at least 2 or more.

As shown in FIG. 8, M×N active matrix domains are disposed generally in a matrix.

Further, pixels are disposed in a matrix in the active matrix domains and at least one thin film transistor is disposed in the pixel. A signal applied to a source of the thin film transistor is controlled by the horizontal scan control carried out by each of the M peripheral circuits and a signal applied to a gate of the thin film transistor is controlled by the vertical scan control carried out by each of the N peripheral circuits.

The pixels in the above-mentioned formation may be exemplified by the domain in which they are indicated by addresses (0, 0), (1, 0), . . . (m, n) shown in FIG. 8. In the formation shown in FIG. 8, one thin film transistor is disposed per pixel.

It is noted that the number of thin film transistors disposed in each pixel is not confined to only one. It may be disposed by connecting a plurality of them in series or in combination with a MOS capacitor. Further, it is possible to combine those of different channel type, not only the same channel type.

It is noted that the formation shown in FIG. 8 requires that light transmits through the liquid crystal panel, so that it is necessary to use a material having a translucent quality for the substrate. In concrete, it is necessary to use the glass or quartz substrate.

An operational example of the formation shown in FIG. 8 will be explained briefly. In the formation shown in FIG. 8, the operation of the vertical scan control circuits 709 and 710 is controlled basically by the operation clock CLKV for the vertical scan control circuit and the operation of the horizontal scan control circuits 701 and 702 is controlled by the operation clock CLKH for the horizontal scan control circuit.

In order to simplify the explanation, a method for displaying an image on the active matrix domain 703 will be explained below. It is noted that the operation of the other active matrix domains is equivalent to that of the active matrix domain 703.

At first, a VSTA (vertical scan timing enable signal) is beaten when a leading edge of the CLKV (operation clock of the vertical scan control circuit) is input to a flip-flop circuit 802 of the vertical scan control circuit 709. At this time, the output of the flip-flop circuit turns to H (logically high level). Output levels of the other flip-flop circuits on the vertical scan control circuit 709 remain on L level.

As a result, a gate signal line 811 indicated by a row $Y_0$ turns to H level. Then, thin film transistors at addresses (0, 0), (1, 0) . . . (m, 0) are all turned ON.

In this state, a HSTA (horizontal scan timing enable signal) is beaten by the CLKH (operation clock of the horizontal scan control circuit) in a flip-flop circuit 801 of the horizontal scan control circuit 701 and the signal level at point $X_0$ turns to H level. At this time, points at $X_1$ and after are on L (logically Low level).

As a result, an H signal is input to a sample and hold circuit 804 via an image sampling signal line 808 and R image data signal is taken into the sample and hold circuit 804.

Then, the image data flows through an image signal line 809. That is, the image data signal is applied to sources of thin film transistors at addresses (0, 0) (0,1), (0, 2) . . . (0, n).

In this state, the thin film transistors at addresses (0, 0), (1, 0) . . . (m, 0) are all ON and the image data signal is applied to the sources of the thin film transistors at addresses (0, 0) (0, 1), (0, 2) . . . (0, n). Accordingly, the image data is written at the pixel at the address (0, 0).

Then, the output of the flip-flop circuit 801 turns to L level when the next leading edge of the CLKH is input. That is, the point $X_0$ turns to L level. On the other hand, the output of the flip-flop circuit 806 turns to H level when the leading edge of the CLKH is input. That is, the level at the point $X_1$ turns to H level.

As a result, image data is written to a pixel at the address (1, 0). Thus, the output of the flip-flop circuit $X_m$ is shifted sequentially to H level in accordance to the operational clock of the CLKH. Then, image information is written to a pixel at the address (m, 0).

When writing information on the row $Y_0$ is completed, the output level of the flip-flop circuit 802 turns to L and the output level of the flip-flop circuit 803 turns to H by the next leading edge of the CLKV. As a result, the level of signal on the row $Y_1$ turns to H.

Then, image data information is written sequentially to the pixels at the addresses (0, 1), (1, 1), (2, 1), . . . (m, 1) on the row $Y_1$. At the moment when information is written up to the pixel at the address (n, m), one frame is finished.

The above-mentioned operation is carried out in the same timing also in the active matrix domains other than the active matrix domain 703.

The use of the integrated liquid crystal panels shown in FIG. 8 enables to obtain two color images composed of RGB in the same time. These color images may have different contents respectively as a matter of course.

Figure 9:
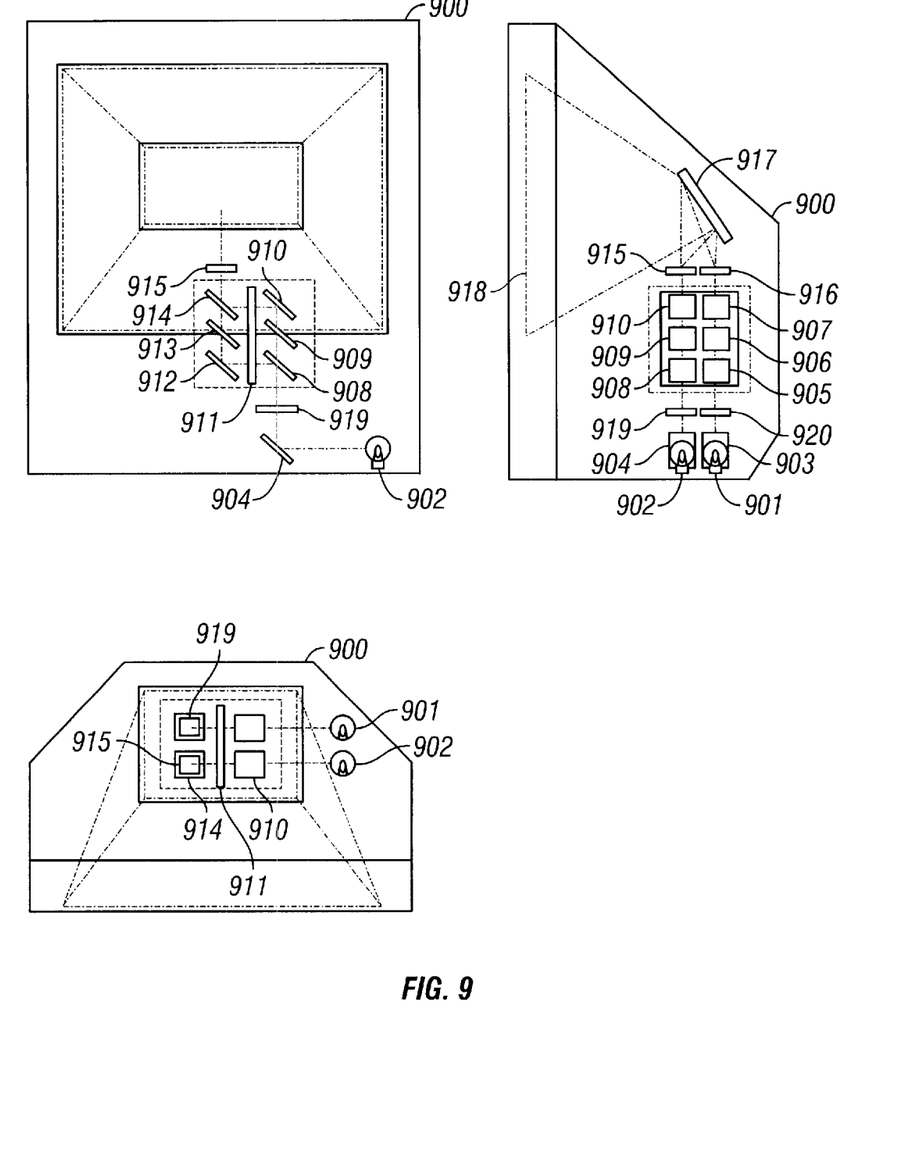
FIG. 9 is a drawing showing a projector type display unit.

Next, a projecting type liquid crystal display unit utilizing the liquid crystal panel in which six active matrix domains shown in FIG. 8 are integrated will be explained. FIG. 9 shows an outline of the projecting type liquid crystal display unit explained in the present embodiment.

The display unit shown in FIG. 9 may be utilized to the formations of the other embodiments disclosed in the present specification. In the formation shown in FIG. 9, light emitted from a first light, source 902 is reflected by a mirror 904 and transmits through a polarizing plate 919.

It is noted that when it is necessary to form two different images in order to display a three-dimensional image or different images for example, a π cell 920 is turned OFF so that a plane of polarization of the linearly polarized light that always transmits turns by 90°.

The light output from the π cell is separated into lights in wavelength ranges corresponding to GBR by dichroic mirrors 908, 909 and 910. Then, each or those lights is input to the integrated liquid crystal panel 911 shown in FIG. 7.

The light optically modulated by each pixel domain corresponding to RGB in the liquid crystal panel 911 is reflected such that an image of G is reflected by a mirror 912, an image of B is reflected by a half mirror (semi-transparent mirror) 913 and an image of R is reflected by a half mirror (semi-transparent mirror).

A color image thus combined is reflected further by a mirror 917 via an optical system 915 and is projected onto a screen (projecting face) 918. The optical system 915 is equipped with lenses necessary for expanding and projecting the image. The optical system 915 is also equipped with an optical shutter for selectively transmitting or blocking the light as necessary and means for giving a predetermined polarization.

Meanwhile, light emitted from a light source 901 is reflected by a mirror 903 and is put into a predetermined polarization state by a polarizing plate 920. The polarizing direction of the polarizing plate 920 is different from that of the polarizing plate 919 by 90°.

It is noted that the polarizing directions of the polarizing plates 919 and 920 are set in accordance to the polarizing directions of the respective active matrix domains shown in FIG. 7A.

The light output from the polarizing plate 920 is separated into lights corresponding to G', B' and R' by dichroic mirrors 905, 906 and 907, respectively. Then, those lights are optically modulated into images corresponding to G', B' and R' in the liquid crystal panel.

The optically modulated lights corresponding to R', G' and B' (six beams in total) are combined by a group of mirrors not shown and are projected via the optical system 915 and a mirror 916. The projected image is reflected by a mirror 917 and is projected to the screen 918.

Thus, two different color images are projected onto the screen 918 in superposition. That is, they are the color image formed in the active matrix domains 703 through 705 and that formed in the active matrix domains 706 through 708 in FIG. 8.

These two color images have polarizing directions different by 90° from each other. That is, one color image and the other color image have directions of linearly polarized light different by 90° from each other. When these images are seen by glasses provided with polarizing filters having different polarizing directions for right and left eyes, the images which differ for the right and left eyes may be seen in the same time. A stereoscopic image may be seen by utilizing this fact. Further, it allows a plurality of persons to see different images.

The formation shown in FIG. 9 has a usefulness that it allows to obtain a bright image because a plurality of images are superposed.

Further, if the two images are the same one, the formation shown in FIG. 9 allows to display a bright image on which just two RGB images are superposed two-dimensionally. That is, the formation shown in FIG. 9 may bemused as a just normal display unit.

Seventh Embodiment

In the present embodiment, quarter wavelength plates are disposed in the optical systems 915 and 916. The light input to each optical system has the linear polarization whose polarizing direction is different by 90°. Accordingly, a circularly polarized light whose turning direction differs each other may be obtained by inserting the quarter wavelength plate in the optical path.

That is, it becomes possible to obtain a clockwise circularly polarized light image and a counterclockwise circularly polarized light image and to project them on one and the same screen in superposition. Then, those two images may be seen separately by seeing the screen by using optical filters which selectively transmit lights of respective turning directions.

The present embodiment also allows to obtain a just normal two-dimensional display if the two images are the same one.

The adoption of the inventive formations disclosed in the present specification allows different images and a stereoscopic image to be displayed with the simple formation. Because it allows the formation to be simplified, the general utility of the unit may be increased. Further, it can provide the display unit whose cost is low, which is highly reliably, which has an excellent wide utility and which can display three-dimensional images. Further, by the same principle with the display of three-dimensional images, the formation by which two different images can be displayed on one screen can be provided.

Further, the use of the integrated liquid crystal panel allows the whole formation to be simplified and the manufacturing processes and production cost to be reduced.

What is claimed is:

1. A display unit comprising:
   a substrate;
   a first active matrix region provided over said substrate;
   a second active matrix region provided over said substrate, said first active matrix region and said second active matrix region being completely provided outside each other;
   a first pair of polarizers each provided on said first active matrix region outside said second active matrix region; and
   a second pair of polarizers each provided on said second active matrix region outside.said first active matrix region,
   wherein a first image is formed by said first active matrix region and said first pair of polarizers, and a second image is formed by said second active matrix region and said second pair of polarizers,
   wherein said first image and said second image have different polarization states from each other according to said first pair of polarizers and said second pair of polarizers, respectively, and wherein said first active matrix region comprises a plurality of pixels arranged in a matrix.

2. The display unit of claim 1 wherein said respective images having different polarization states are projected on a screen.

3. The display unit of claim 1 further comprising:
an opposite substrate; and
an electro-optical modulating layer provided between the two substrates.

4. The display unit of claim 3 wherein said electro-optical modulating layer comprises a liquid crystal.

5. The display unit of claim 4 wherein said liquid crystal comprises a nematic liquid crystal.

6. The display unit of claim 1 wherein said respective images are an image for right eye and an image for left eye.

7. The unit of claim 1 wherein each of said two active matrix regions comprises a plurality of pixels arranged in matrix, each of said pixels having a thin film transistor.

8. The unit of claim 7 further comprising a pixel electrode provided in each of said pixels and connected with the corresponding thin film transistor.

9. The unit of claim 1 wherein said first image is for right eye, and said second image is for left eye.

10. A display unit comprising:
a first electro-optical panel and a second electro-optical panel provided offset from each other;
a first substrate having a first side part of said first electro-optical panel and a first side part of said second electro-optical panel;
a second substrate having a second side part of said first electro-optical panel and a second side part of said second electro-optical panel to sandwich a first electro-optical modulating layer between said first and second side parts of said first electro-optical panel and to sandwich a second electro-optical modulating layer between said first and second side parts of said second electro-optical panel; and
means for projecting images from said two electro-optical panels on one and the same projecting face in superposition,
wherein each of said two electro-optical panels has a first polarizing plate and a second polarizing plate in order from a light source, and
a polarizing direction of said first polarizing plate of said first electro-optical panel and a polarizing direction of said second polarizing plate of said second electro-optical panel are same or almost the same.

11. The unit of claim 10 wherein said first electro-optical panel forms a right-eye image, and said second electro-optical panel forms a left-eye image.

12. A display unit comprising:
a substrate;
a first active matrix region provided over said substrate;
a second active matrix region' provided over said substrate, said first active matrix region and said second active matrix region being completely provided outside each other;
a first pair of polarizers each provided on said first active matrix region outside said second active matrix region; and
a second pair of polarizers each provided on said second active matrix region outside said first active matrix region, wherein a first image is formed by said first active matrix region and said first pair of polarizers, and a second image is formed by said second active matrix region and said second pair of polarizers,
wherein said first image and said second image have different polarization states from each other according to said first pair of polarizers and said second pair of polarizers, respectively,
wherein said first active matrix region comprises a plurality of first pixels arranged in a first matrix, and
wherein said second active matrix region comprises a plurality of second pixels arranged in a second matrix.

13. The display unit of claim 12 wherein said respective images having different polarization states are projected on a screen.

14. The display unit of claim 12 further comprising:
an opposite substrate; and
an electro-optical modulating layer provided between the two substrates.

15. The display unit of claim 12 wherein said respective images are an image for right eye and an image for left eye.

16. The display unit of claim 12 further comprising a pixel electrode provided in said pixel and connected with said thin film transistor.

17. A display unit comprising:
a substrate;
a first active matrix region provided over said substrate;
a second active matrix region provided over said substrate, said first active matrix region and said second active matrix region being completely provided outside each other;
a first pair of polarizers each provided on said first active matrix region outside said second active matrix region; and
a second pair of polarizers each provided on said second active matrix region outside said first active matrix region,
wherein a first image is formed by said first active matrix region and said first pair of polarizers, and a second image is formed by said second active matrix region and said second pair of polarizers,
wherein said first image and said second image have different polarization states from each other according to said first pair of polarizers and said second pair of polarizers, respectively, and
wherein each of said first active matrix region and said second active matrix region comprises a pixel having at least one thin film transistor provided over said substrate, said thin film transistor comprising a semiconductor film made of a crystalline silicon, and
wherein said first active matrix region comprises a plurality of pixels arranged in a matrix.

18. The display unit of claim 17 wherein said respective images having different polarization states are projected on a screen.

19. The display unit of claim 17 further comprising:
an opposite substrate; and
an electro-optical modulating layer provided between the two substrates.

20. The display unit of claim 17 wherein said respective images are an image for right eye and an image for left eye.

21. The display unit of claim 17 further comprising a pixel electrode provided in said pixel and connected with said thin film transistor.

22. A display unit comprising:

a substrate;

a first active matrix region provided over said substrate;

a second active matrix region provided over said substrate, said first active matrix region and said second active matrix region being completely provided outside each other;

a first pair of polarizers each provided on said first active matrix region outside said second active matrix region; and a second pair of polarizers each provided on said second active matrix region outside said first active matrix region, wherein a first image is formed by said first active matrix region and said first pair of polarizers, and a second image is formed by said second active matrix region and said second pair of polarizers, wherein said first image and said second image have different polarization states from each other according to said first pair of polarizers and said second pair of polarizers, respectively, and wherein each of said first active matrix region and said second active matrix region comprises a plurality of pixels disposed in a matrix, each of said pixels having at least one thin film transistor provided over said substrate.

23. The display unit of claim 22 wherein said respective images having different polarization states are projected on a screen.

24. The display unit of claim 22 further comprising:

an opposite substrate; and an electro-optical modulating layer provided between the two substrates.

25. The display unit of claim 22 wherein said respective images are an image for right eye and an image for left eye.

26. The display unit of claim 22 further comprising a pixel electrode provided in each of said pixels and connected with the corresponding thin film transistor.

27. A display unit comprising:

a substrate;

a first active matrix region provided over said substrate;

a second active matrix region provided over said substrate, said first active matrix region and said second active matrix region being completely provided outside each other;

a first pair of polarizers each provided on said first active matrix region outside said second active matrix region; and a second pair of polarizers each provided on said second active matrix region outside said first active matrix region, wherein a first image is formed by said first active matrix region and said first pair of polarizers, and a second image is formed by said second active matrix region and said second pair of polarizers, wherein said first image and said second image have different polarization states from each other according to said first pair of polarizers and said second pair of polarizers, respectively, and wherein each of said first active matrix region and said second active matrix region comprises a plurality of pixels disposed in a matrix, each of said pixels having at least one thin film transistor provided over said substrate, said thin film transistor comprising a semiconductor film made of a crystalline silicon.

28. The display unit of claim 27 wherein said respective images having different polarization states are projected on a screen.

29. The display unit of claim 27 further comprising:

an opposite substrate; and an electro-optical modulating layer provided between the two substrates.

30. The display unit of claim 27 wherein said respective images are an image for right eye and an image for left eye.

31. The display unit of claim 27 further comprising a pixel electrode provided in each of said pixels and connected with the corresponding thin film transistor.

32. A display unit comprising:

a substrate;

a first active matrix region provided over said substrate;

a second active matrix region provided over said substrate, said first active matrix region and said second active matrix region being completely provided outside each other;

a circuit provided over said substrate for driving said first active matrix region and said second active matrix region;

a first pair of polarizers each provided on said first active matrix region outside said second active matrix region; and a second pair of polarizers each provided on said second active matrix region outside said first active matrix region, wherein a first image is formed by said first active matrix region and said first pair of polarizers, and a second image is formed by said second active matrix region and said second pair of polarizers, wherein said first image and said second image have different polarization states from each other according to said first pair of polarizers and said second pair of polarizers, respectively, and wherein said first active matrix region comprises a plurality of pixels arranged in a matrix.

33. The unit of claim 32 wherein said first image is for right eye, and said second image is for left eye.

* * * * *